Oct. 20, 1936.  W. E. PERRY  2,058,101

PATTERN CONTROL MECHANISM

Filed Feb. 8, 1936   6 Sheets-Sheet 1

INVENTOR.
WILLIAM E. PERRY

BY Richards & Geier
ATTORNEYS

Oct. 20, 1936.   W. E. PERRY   2,058,101
PATTERN CONTROL MECHANISM
Filed Feb. 8, 1936   6 Sheets-Sheet 2

INVENTOR.
WILLIAM E. PERRY
BY
Richards & Geier
ATTORNEYS

Oct. 20, 1936.    W. E. PERRY    2,058,101
PATTERN CONTROL MECHANISM
Filed Feb. 8, 1936    6 Sheets-Sheet 4

INVENTOR.
WILLIAM E. PERRY
BY
Richards & Geier
ATTORNEYS

Oct. 20, 1936.   W. E. PERRY   2,058,101
PATTERN CONTROL MECHANISM
Filed Feb. 8, 1936   6 Sheets-Sheet 6

INVENTOR.
WILLIAM E. PERRY
BY
Richards & Geier
ATTORNEYS

Patented Oct. 20, 1936

2,058,101

UNITED STATES PATENT OFFICE 2,058,101

PATTERN CONTROL MECHANISM

William E. Perry, Scranton, Pa., assignor to The Scranton Lace Company, Scranton, Pa., a corporation of Pennsylvania Application February 8, 1936, Serial No. 62,894

1 Claim. (Cl. 139—319)

The present application relates to an apparatus for controlling the patterns of fabrics, particularly woven and knitted fabrics, and it particularly relates to an electrical jacquard control system.

The jacquard control systems now utilized are mechanically actuated by a plurality of punched heavy cardboard sections which are received upon a prismatic carrier or cylinder, the sides of which are provided with a series of openings corresponding to the maximum number of holes which may be punched into the pattern card.

The heddles carrying the warp threads in the case of the loom or the corresponding jacks in the case of a Nottingham lace machine are all connected with a series of linen cords to a plurality of hooks which are normally adapted to engage a vertical reciprocating element grid, or griffe which lifts the heddles of a Jacquard loom and moves the jacks in the case of a Nottingham machine.

However, each one of the hooks is provided with a rod element which permits the hook to be engaged by the reciprocating grid when the end of the rod enters the punched hole in the card and the corresponding hole in the prism carrying the card.

When, however, the rod does not enter one of the punched holes in the card, the rod is pushed back and carries back the hook so that it does not engage the reciprocating grid or griffe.

These jacquard mechanism require that heavy cardboards be punched for each position and sometimes hundreds and thousands of these heavy boards must be prepared in order to make a single pattern.

The punching operation with these heavy pattern cards not only requires special machinery and special operators for the machinery, but in addition, after the cards have been used, they cannot be readily sold or disposed of and they constitute a source of serious waste.

In addition, these mechanical connections necessitate that the card be of more or less limited size and also limit the number of hooks and push rods which may be employed to control a desired pattern.

As a result, with many fabrics where the width of the fabric exceeds a certain amount, it is necessary to double or even quadruple the number of heddles, which are controlled from any one hook of the jacquard mechanism.

This not only throws an extra strain on the jacquard mechanism, but in addition limits the arrangement of patterns which may be woven, since the patterns must be repeated within a certain lateral width on the weaving machine, or otherwise, efficient operation will not be obtained.

Furthermore, with these jacquard machines, it is necessary to extend the linen threads for a considerable distance up to the jacquard mechanism which is usually placed a story or more above the weaving machine upon an elevated superstructure.

With exceptionally wide weaving machines, such as Nottingham lace machines, this extension of the linen threads may be so substantial that serious change in length thereof may take place with varying humidity and temperature conditions, and even with relatively small Jacquard looms, there is considerable difficulty experienced with the stretching and shrinking of the linen threads which connect the heddles to the jacquard mechanism.

In addition, the feeding of cards required a certain delay between each operation and the speed of the Jacquard loom or Nottingham machine is necessarily controlled by the length of time which it takes to change the cards and enable proper registry of the push rods with the punched cards during the selecting operation.

It is among the objects of the present invention to provide a more rapid method and means for weaving pattern fabrics such as lace curtains or nets, bedspreads, table cloths, damasks, carpets, dress goods and so forth, in which the fabric may be produced at a faster rate and at less cost without the necessity of punching out hundreds of relatively heavy stiff pattern cards and with assurance that the weave or mesh of the fabric will be made up in a uniform fashion, even though there will be considerable change in humidity and temperature conditions during the manufacturing operation.

Another object is to provide an improved jacquard mechanism which may be controlled by relatively small and inexpensive pattern cards and in which the design of the pattern fabric to be produced may vary for the entire width of the loom or Nottingham machine without the necessity of lateral repeats of fixed width to accommodate a limited mechanical jacquard mechanism.

Another object is to provide a jacquard control system which may be operated and actuated by relatively thin paper cards, which may be readily punched by key board machines of the size and character of operation of typewriters and adding machines and which may be readily operated by typists without the necessity of employing special skilled help and special punching machinery, and which cards may be readily reproduced without difficulty.

Another object is to provide a jacquard control mechanism in which the effect of humidity and temperature might be largely eliminated and in which the long and extensive linen threads, subject to stretching and shrinkage, might either be shortened or altogether avoided in the operation of the machine.

Another object of the present invention is to provide a jacquard control mechanism, in which the height of the machine may be lessened and in which the jacquard control machine may be positioned in one story buildings of ordinary type without the necessity of building superstructures to carry the linen guide threads and an elevated jacquard mechanism.

Other objects will be obvious or will appear during the course of the following specification.

In accomplishing these objects, it has been found most satisfactory to utilize a series of relatively thin flexible paper cards which may be cut by a punching machine arranged like a typewriter or adding machine and, which may be utilized in connection with accounting machines.

These cards, one being utilized for each motion of the loom or lace machine, are punched with rectangular or round holes and they are adapted to control the heddles or jacks across the entire width of the textile manufacturing device.

These cards are preferably fed in the form of a stack to an electrical reading machine which is connected by means of cables and wires to a plurality of solenoids arranged to connect or disconnect the various thread guide elements whether they be heddles or jacks to form a desired pattern.

It is preferred to arrange the solenoids quite close to the heddles or jacks which they control so that the machine may be most compactly constructed.

The above and other objects will appear more clearly from the following detailed description when taken in connection with the accompanying drawings, which illustrate several preferred embodiments of the inventive idea.

Referring to the drawings.

Figure 6:
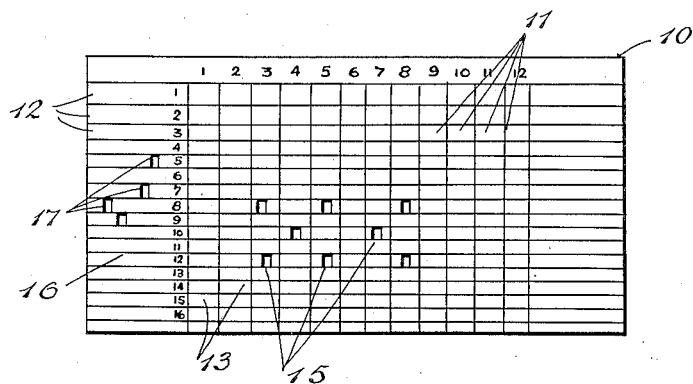
Figure 6 is a plan view of a card which may be employed.

Referring to Figure 6, the card may consist of a relatively thin sheet of flexible paper having a plurality of vertical rows of spaces 11 and a plurality of horizontal rows of spaces 12, said spaces receiving perforations.

Figure 7:
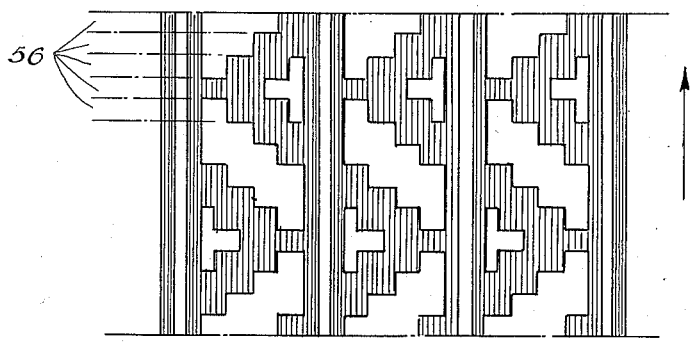
Figure 7 illustrates a typical design or pattern which may be transferred to the card of Figure 6.

The squares 13 formed by the intersection of the rows 11 and 12 may receive one or more rectangular punched holes 15 to correspond to a pattern such as shown in Figure 7 and the left hand margin 16 of the card may also be provided with a plurality of punched holes 17 to enable the card to be indexed in its proper order in forming the desired pattern.

Figure 6 does not indicate all the openings that may be employed but illustrates just a few of the openings that may be formed for purposes of illustration and in the usual form of card, the openings will be arranged in any desired number and arrangement in the margin 16 and in the squares or rectangles 11 to enable indexing of the cards and to assure reproduction of a pattern such as shown in Figure 7.

In punching the cards to place upon them a design, such as indicated in the layout of Figure 7, the mechanism as shown in Figures 1 to 7 may be employed and it is to be understood that punching mechanism generally of the type utilized in connection with Hollerith accounting machines may also be utilized.

In the punching mechanism of Figures 1 to 5, there is provided a board 18 provided with the keys 19 said keys 19 being capable of punching one horizontal row 12 of the card 10 at a time.

Figure 9:
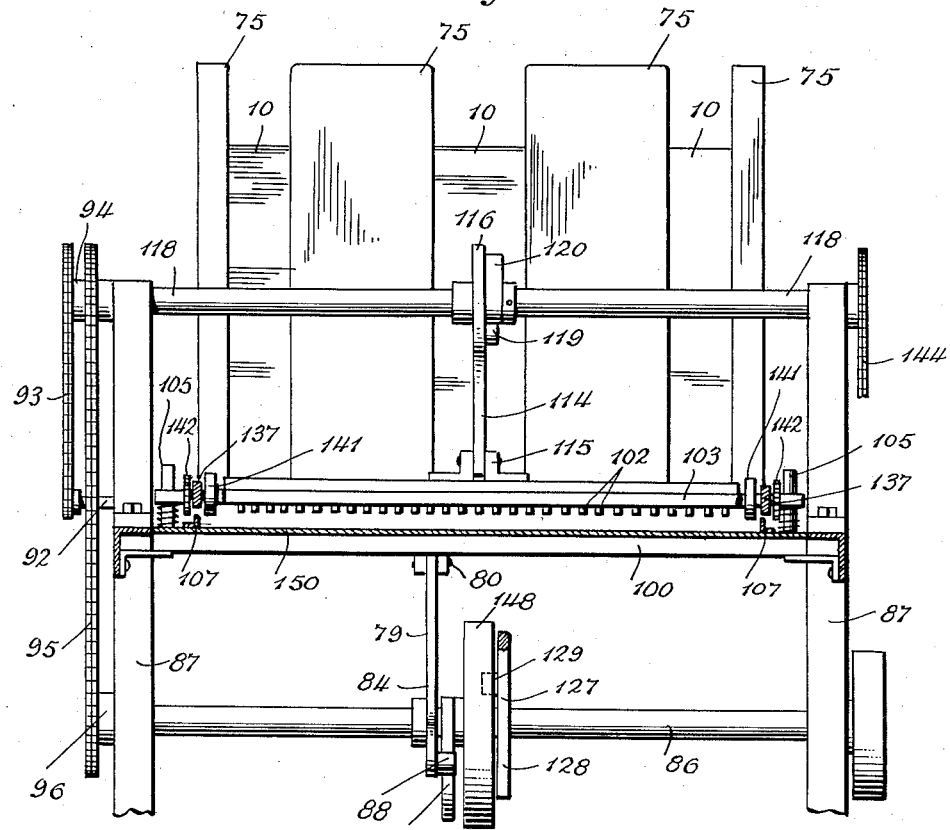
Figure 9 is a transverse sectional view upon the line 9—9 of Figure 8 of an electrical reading mechanism.

The number of keys shown in Figure 9 is merely illustrative and it is to be understood that as many keys may be employed as would correspond to the maximum number of punched holes, which one of the horizontal rows 12 might receive.

The cards 10 to be punched are placed on the floor portion 31 in front of the book 26 carried by the slider 25.

By the handle 22, pivotally mounted at 23, to the side of the casing 24, the cards may be advanced by the slider 25 one by one to punching position.

The slider 25 is actuated by the link 27, which is pivotally connected between the points 28 and 29, the pivotal connection 29 to the slider 25 riding in the slot 30 in the casing 24.

The card 10, when moved by the slider 25, slides over the floor plate 31 and under the retaining plate 32 (see Figure 2) until the desired horizontal row 12 on the card goes over the row of openings 33 and under the guide sleeves 34 which receive the punch pins 35.

Each of the punch pins is pivotally connected at 36 to the arm 37 and is normally biased upwardly by the spring 39 so that the punch 35 clears the runway 38 for the card 10 between the base plate 31 and the holder plate 32. The spring 39 reacts against the horizontal lever arm 37 and the sleeve 34.

Each of the levers 37 is pivotally mounted at one end at 40 in the casing 24 and at its other end is provided with upwardly extending portions 41, which pass upwardly through the openings 42, said rod like elements 41 being provided with stop sleeves 43 to contact with the plate 18 and limit movement of the rods 41 under the influence of the springs 39.

Each of the rods 41 carries at its upper end a finger piece 19 which may be operated by the typist or operator to punch the card.

Figure 1:
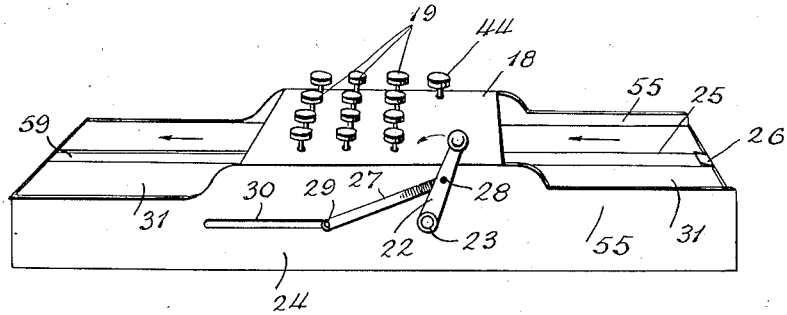
Figure 1 is a top perspective view of a card punching machine.
Figure 2:
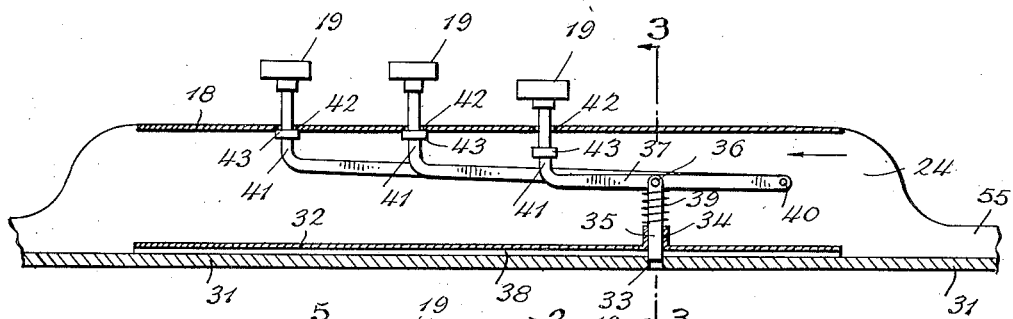
Figure 2 is a side sectional view upon an enlarged scale and upon the line 2—2 of Figure 3.
Figure 3:
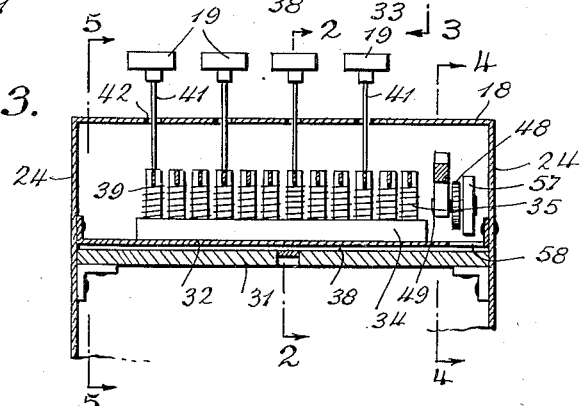
Figure 3 is a side sectional view upon the line 3—3 of Figure 2.

As indicated in Figure 3, when the card is advanced to the desired position with a horizontal row 12 between the openings 33 and 34, one of the rows 12 may then be punched.

Figure 4:
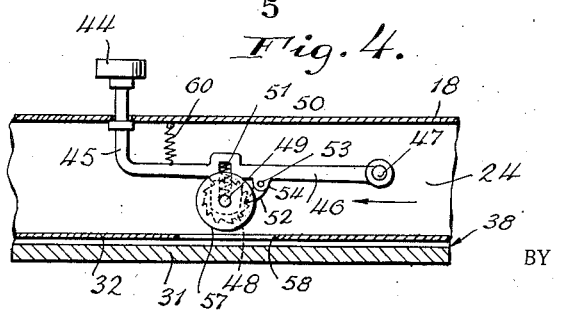
Figure 4 is a side sectional view upon the line 4—4 of Figure 3.
Figure 5:
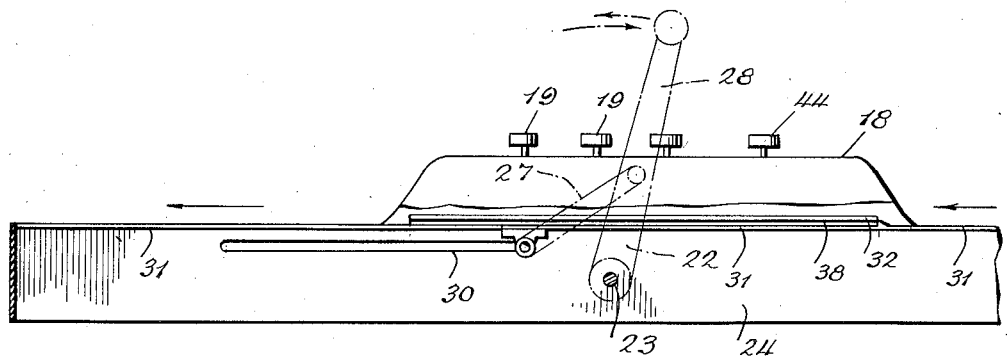
Figure 5 is a side view on the line 5—5 of Figure 3.

It is then necessary to advance the card 10 to the next row and this is accomplished by the finger piece 44 which is provided with the downwardly extending rod 45 and forwardly extending arm 46 pivotally mounted at 47 on the casing 24 (see Figure 4).

The arm 46 carries the ratchet wheel 48, which has the pivot 49 riding in the slot 50 and normally depressed by the spring 51. The feed roller 57 is carried on the ratchet shaft 49 and moves with the ratchet wheel 48.

The ratchet wheel 48 is normally held against movement by the pawl 52 which is pivotally mounted at 53 on the ear 54 of the arm 46.

In operation, the card 10 is laid in front of the tooth 26 of the slider 25 and between the guideways 55.

The handle 28 is then actuated to advance the card so that its first row 12 will be in position to be punched by the pins 35.

The operator then reading the design of Figure 7 presses the necessary number of keys in each row 12. One card 10 will be used for each movement of the loom or Nottingham machine, one movement producing each horizontal row 56 indicated in Figure 7.

When the first row 12 has been punched, the card may then be advanced one row at a time by the device shown in Figure 4. When the key 44 is depressed the roller 57 will engage the card and as the key is pressed down beyond such point of engagement, the pawl 52 will advance the ratchet 48 one tooth with the pivot 49 moving upwardly in the slot 50. This will advance the card 10 by one row 12.

As soon as the next row 12 is cut, the finger piece 44 is again depressed and another row may be cut, and by a skilled operator the cards of Figure 6 may be cut as speedily and even more speedily than it would take to make corresponding lines of typing.

The card, after all the rows 12 have been punched, may be ejected from the punching position by insertion of the next card by the slider 25.

After the cards have been punched, they are stacked. They may then be checked, if desired, by automatic machinery. The cards for this purpose are passed into a sorting machine which will correct their order as indicated by the punch marks 17 in the card of Figure 6.

The cards may also be readily duplicated, in case they become worn or damaged, and in order to control other machines, by mechanisms such as are shown in patents Schaaf, 1,300,491, April 15, 1919; Lee, 1,722,186, Aug. 5, 1930; Reynolds, 1,761,682, June 3, 1930; Bryce, 1,791,950, Feb. 10, 1931; and Schaaf, 1,821,078, Sept. 1, 1931.

Instead of the punching device shown in Figures 1 to 5, other punching mechanisms such as disclosed in the above patents or in patents Richter, 1,803,977, May 5, 1931; Schaaf, 1,803,979, May 5, 1931; and Mills, 1,845,001, Feb. 16, 1932 may also be utilized.

If any of the cards are improperly made or punched and this is found either upon checking of the cards or weaving or knitting of the initial sample of fabrics, then a replacement may be readily cut without great expense, as contrasted to the previous practice of laboriously correcting the cards because of the difficulty of replacing them and then tying them into the chain of cards, which is ordinarily utilized in connection with the jacquard mechanism.

After the cards have been prepared to produce the patterns, they are next placed in an indicating or reading machine which will control a loom or Nottingham machine, or a knitting machine in accordance with the pattern punched upon the cards, each motion 56 (see Figure 7) of the textile manufacturing machine being controlled by one card 10 as shown in Figure 6.

Figure 8:
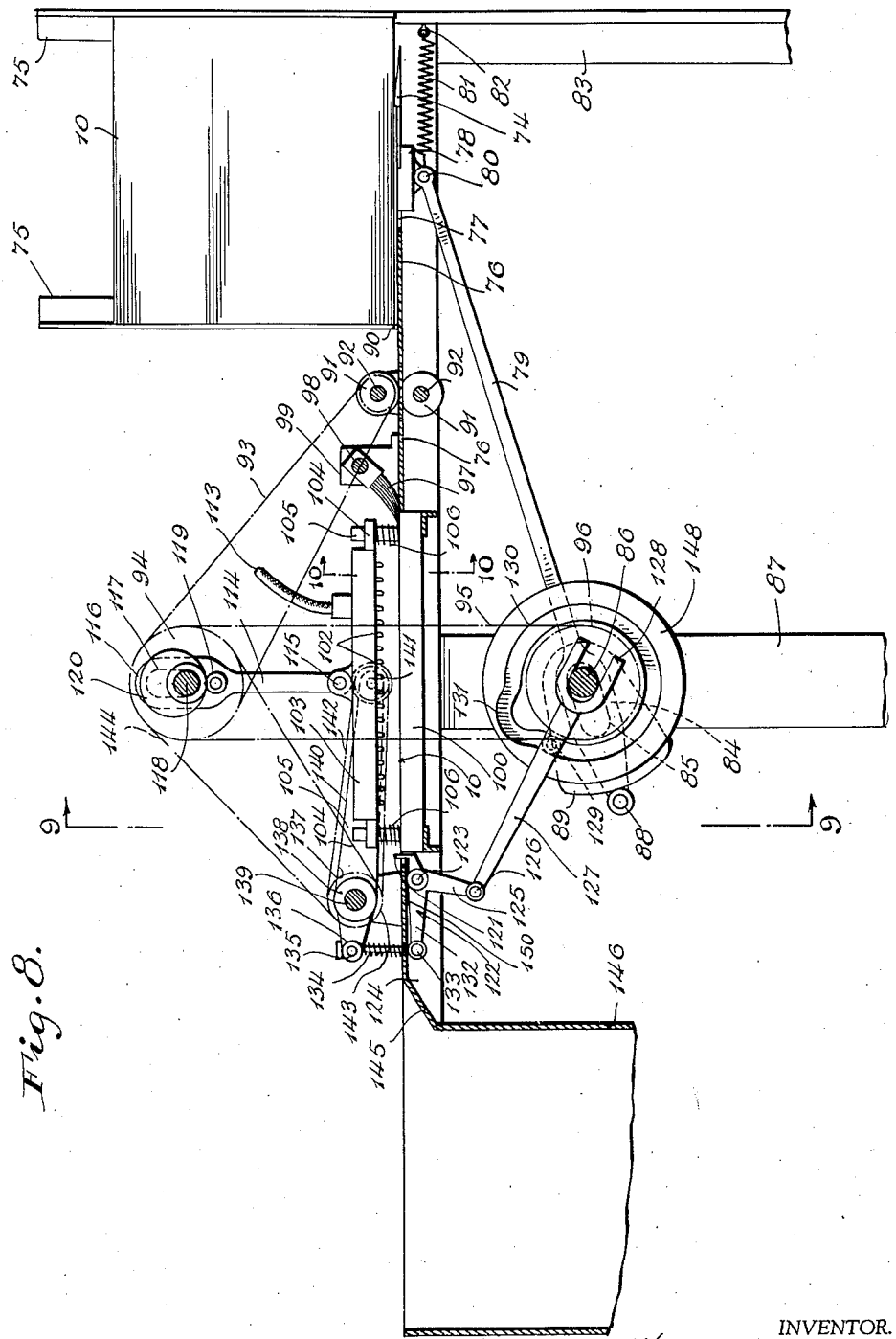
Figure 8 is a side view of the electrical reading mechanism.
Figure 10:
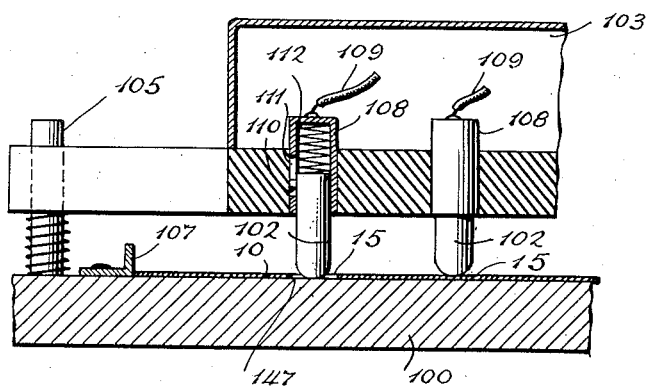
Figure 10 is an enlarged detail view of the electrical reading mechanism.

Referring to Figures 8 to 10, the cards 10 are placed in the stacking guides 75 of the reading and indicating machine. The reading and indicating machine, as shown in Figures 8 to 10 is provided with a floor plate 76 carrying said stacking guides 75.

The plate 76 is slotted as indicated at 77 to receive the reciprocating pusher 78 which is actuated by the rod 79 pivotally connected to the pusher member 78 at 80.

The pusher 78 is provided with a stepped resilient pick up 74 (see Figure 8) to pick up one card 10 when the pusher 78 moves to its extreme right position.

The pusher member 78 is provided with a return spring 81 which is connected at 82 to the frame of the machine 83.

The rod 79 is provided with a slotted enlargement 84. The slot 85 of the enlargement 84 rides upon the shaft 86 which shaft is carried in the frame 87.

The end of the enlargement 84 carries the roll 88 which rides on the cam 89. The cam 89 turns with the shaft 86.

As shown in Figure 8, the roller 88 is riding over the lobe of the cam 89 and the pusher member 78 is drawn to its extreme left position where it will advance one of the cards 10 through the opening 90 (see Figure 8) in the inside stacking guides 75 to the continuous feed rollers 91.

These feed rollers are rotated on the shafts 92 and the upper shaft 92 may be driven by chain 93 from the pulley 94.

The shaft 86 may also be driven from the shaft 118 by the chain 95 and the driving member 96.

The card 10 after being advanced by the push member 78 and picked up by the rollers 91, is shot under the anti-rebound brush 97 which is pivotally mounted at 98 on the pedestal 99.

The card will normally be advanced by the rollers 91 to above the electrical contact plate 100 and to below the reciprocating plate 103. The plate 103 carries the contact pins 102.

The reciprocatory plate 103 is provided with the side ears 104 which ride upon the guide pins 105, said guide pins receiving the return springs 106.

Referring to Figure 10, it will be noted that the lower plate 100 carries the side guide members 107 laterally to position the cards 10 to be read.

As shown in Figure 10, each of the contact pins 102 is received in a sleeve 108 having electrical connections 109. The pins 102 are provided with projections 110 fitting into the slots 111 in the sides of the sleeves 108.

The springs 112 normally press down upon the contact pins 102 and when the plate 103 descends, the pins 102 will be moved up in the sleeves 108 compressing the springs 112.

The curved ends 147 of the pins 102 will be pressed through the punch holes 15 in the card 10 to contact with the electrically charged plate 100 so that a circuit will be closed including the electrical connections 109 (see Figure 10).

Those pins 102 which come opposite unpunched portions of the card 10 will be prevented from contacting with the charged plate 100 by the material of the card.

Figure 11:
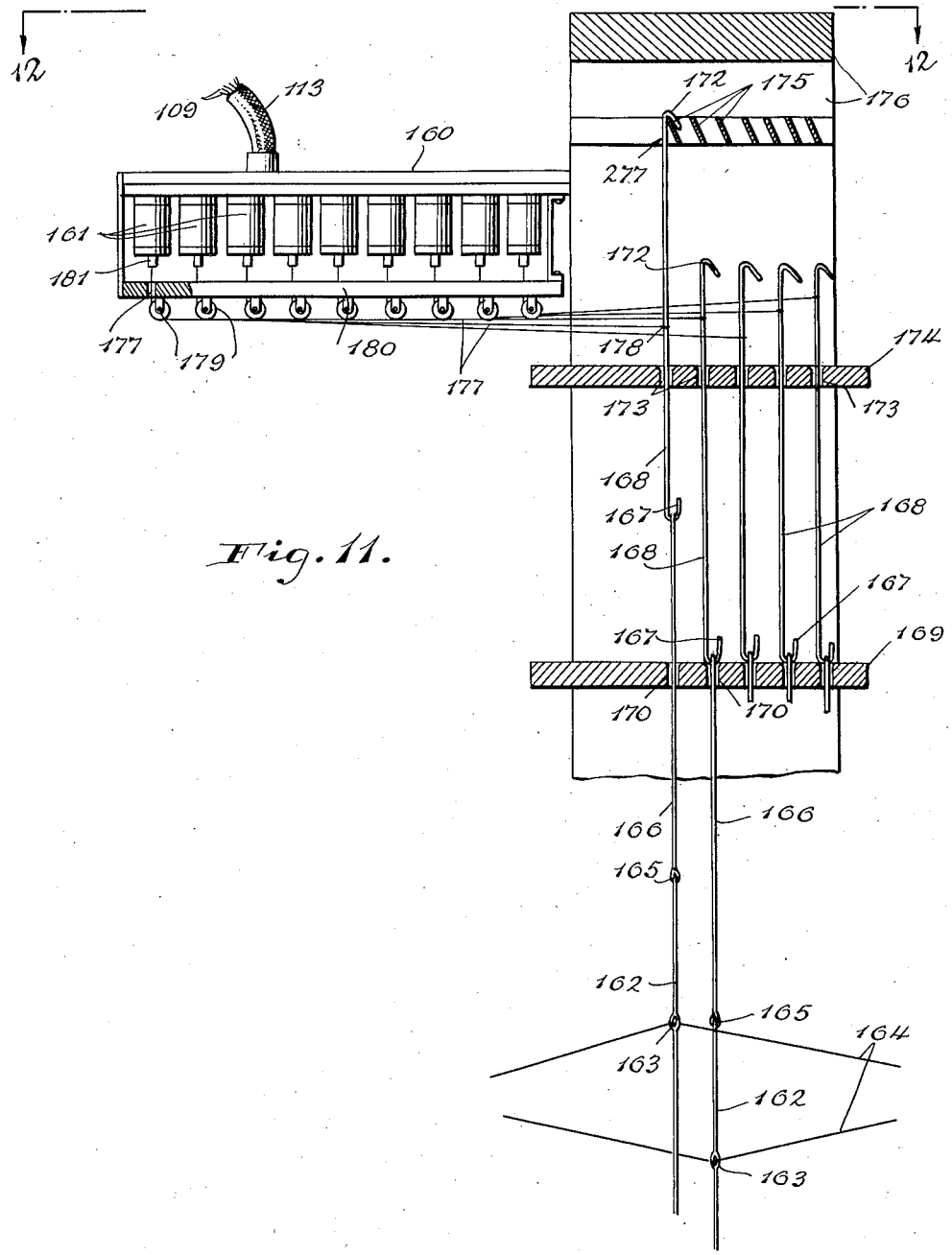
Figure 11 is a diagrammatic side view illustrating how the solenoid arrangement may be employed for controlling the heddles or jacks.
Figure 12:
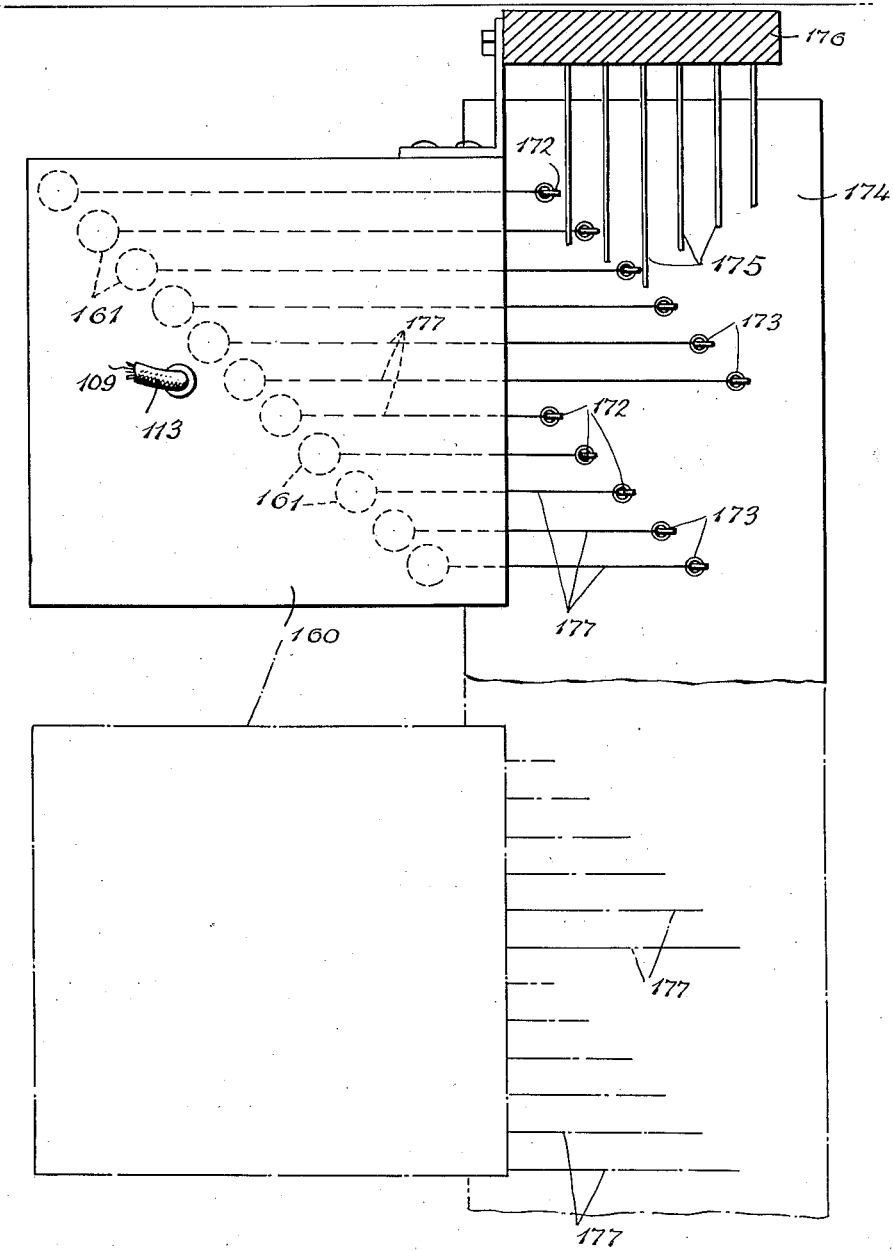
Figure 12 is a top view on the line 12—12 of Figure 11.

All of the electrical connections 109 are collected into a single cable 113, as shown in Figure 8, which leads to the solenoids of the jacquard mechanism shown in Figures 11 and 12.

The plate 103 and its contact pins 102 are actuated through the link 114 which is pivotally connected at 15 to the plate 103. The upper end of the link 114 has an enlarged slotted portion 116, the slot 117 of which is received on the shaft 118.

The follower roll 119 on the enlarged portion 116 is pressed against the cam 120 by the return springs 106 and in the position shown in Figure 8, the roller 119 is riding over the lowest portion of the cam 120.

When the cam 120 moves, however, so that its lobe will be opposite the roller 119, the plate 103 together with its contact pins 102 will be moved downwardly to close the electrical connections 109 corresponding to the punched openings 15 in the card 10.

This lowering movement of the plate 103 and contact pins 102 is synchronized to occur immediately after the card 10 has been picked up by the pusher hook 74 and shot under the plate 103.

When the card 10 has been positioned between the plates 100 and 103 it will be stopped against the projection 121 carried on the lever combination 122 (see Figure 8). When the card 10 is so stopped its rebound is prevented by the brush 97.

The lever 122 is pivotally mounted on the frame 124 at 123 and has a downwardly extending arm 125 pivotally connected at 126 to the arm 127. The arm 127 has an end clevis 128 which rides upon the shaft 86 and a roller 129 which rides in the groove 130 of the element 128. The groove 130 has the lobe 131.

The forward extending arm 132 of the lever 122 is pivotally connected at 133 to the coil-spring-encircled rod 134 which, at its upper end is connected to the shaft 135 fitting into the eye 136 in the lever 137.

The lever 137 is mounted at 138 upon the shaft 139 and at the end of its rearwardly extending arm 140, it is provided with a roller 141 driven by the chain 142 from the pulley 143. The pulley 143 is driven by the chain 144. A lever 137 is preferably provided at each side of the structure shown in Figures 8 and 9.

After the card has been read by the contacts 102, the plate 103 and contact pins will be elevated away from the plate 100. Then the follower roller 129 will pass into the lobe 131 of the groove 130, lowering the plate 121 away from the edge of the card 10, and lowering the lever 142 so that the rollers 141 will contact with the sides of the card 10 and shoot it across the table 150 from under the reciprocating indicating plate 103 (see Figure 8).

The speed of the rollers 141 will be such that the punched card 10 will be slid forwardly until it hits the decline 145 which will guide it into the stacking structure 146 for the used cards.

The roller 129 will then pass out of the lobe 131 replacing the stop 121 and elevating the rollers 141.

The next pattern card 10 will then be picked up by the hook 74, and shot forwardly by the rolls 91 to under the plate 103.

The reading operation is then repeated.

Thus, in the operation of the device, the punched pattern cards 10 are moved one after another, automatically from the stacking holder 75 by the reciprocating pick up 74 and the rollers 91 to between the plates 100 and 103. Each card will be stopped against the plate 121, held between the side guides 107, and rebound will be prevented by the brush 97.

With each card in this position, the contact fingers 102 will descend and energize the circuits 109 in accordance with the openings 15 of the card.

As soon as each pattern card has been read, the stopping plate 121 will be lowered and the rollers 141 will be moved downwardly into contact with the card to advance it rapidly into the stacking structure 146.

If the pattern is to be indefinitely repeated, the cards might be automatically elevated from the stacking structure 146 back into the stacking structure 75 or each card as it is fitted into the stacking structure 146 might be returned to the top of the stacking structure 75.

However, the cost of perforating and making the cards of Figure 6 is so small that it is usually found most desirable to cut the entire series of cards for making a complete pattern repeat or several repeats so that the textile fabric making machine may be operated for a considerable length of time without the necessity of replacing the stack in the holder 75.

Instead of the reading and indicating machines shown in Figures 8 to 10, other types of reading and indicating machines may be utilized such as is shown in patents Pierce, 1,200,129 Oct. 3, 1916; Hollerith, 1,295,167, Feb. 25, 1919; Campbell, 1,658,022, Jan. 31 1928; Lake 1,772,492, Aug. 12, 1930; Lake, 1,822,594, Sept. 8, 1931; and Tripp, 1,824,581, Sept. 22, 1931.

In Figures 11 and 12 is shown the jacquard mechanism of the weaving or knitting machine, which may conveniently be a Jacquard loom or a Nottingham lace machine, a Jacquard loom being illustrated.

As indicated in Figure 11, the cable 113 containing the wires or conductors 109 leads to the solenoid structures 160 which carry the solenoids 161, one solenoid being provided for each wire 109 and one being provided for each heddle 162 or each jack of a Nottingham machine. The solenoid structures 160 are carried by and reciprocate with the griffe or grid 176. Each solenoid 161 includes the movable core or armature 181.

As shown in Figure 11, each of the heddles 162 is provided with an eye 163 which receives the warp end 164. The warp ends are alternately elevated to form sheds or openings through which the shuttles or bobbins (not shown) are thrown.

In the Nottingham machine, jacks are employed instead of the heddles 162 and thin disclike bobbins are thrown between the separated threads to construct the fabric.

The upper portions of the heddles 162 are connected, as indicated at 165 to the wires or threads 166, which are received on the hooks 167 of the double hook members 168.

The fixed plate 169 is provided with a series of guide holes 170, receiving the wires, cords or threads 166, the upper portions of the openings being enlarged to form recesses to receive the hooks 167.

The hook members 168 are guided by the openings 173 in the fixed board 174.

The upper ends of the double hook members 168 are formed into the hooks.

The hooks 172 are adapted to engage the bars 175 which are attached to the reciprocating structure grid or griffe 176, unless drawn out of engagement by the solenoids 161.

Each of the solenoid armatures 181 is connected by the string, cord or chain 177 to a hook member 168 as indicated at 178, the strings or cords 177 passing over the pulleys 179 supported on base 180 of the structure 160.

When the solenoids 161 are not actuated the hooks 172 will engage the bars 175 and will be elevated as indicated at 277 in Figure 11.

On the other hand, when the solenoids 161 are energized the strings 177 connected to the solenoid armatures 181 will be drawn, pulling the hooks 172 out of engagement with the bars 175, so that the hooks 168 and their respective heddles 162 will not be elevated.

The solenoids 161 may be arranged in clusters as indicated in the patents above mentioned or they may be distributed across the entire width of the Jacquard loom or the entire length of the Nottingham machine.

In certain cases the solenoids 161 may be connected to actuate directly the heddles 162 of the loom or the jacks of the Nottingham machine.

However, it is usually preferred that the solenoids merely move the connecting members into and out of engagement with a main actuating member, which will move those heddles or jacks, which have not been disengaged by said solenoids.

It is thus apparent that the present applicant has provided an inexpensive and simple jacquard system by which light weight inexpensive cards such as used on tabulating or accounting machines may be employed to control a Jacquard loom.

The cards may be cut, sorted and stacked by automatic machinery now available and by typists without resorting to expensive machinery necessary with Jacqard looms of modern construction.

By fitting the cards in a stack, as indicated in Figure 8, it is possible to avoid endless chains of cards. It is also possible to select a damaged or improperly punched card by automatic sorting machinery, now available, and repair the same without difficulty.

The necessity of utilizing high ceiling buildings is eliminated and the influence of weather and humidity due to stretching of the jacquard control strings is largely eliminated as indicated in Figures 11 and 12.

The invention, however, is not intended to be restricted to any particular construction or arrangement of parts, or to any particular application of any such construction, or to any specific method of operation, or manner of use, or to any of various details thereof herein shown and described, as the same may be modified in various particulars or be applied in many varied relations without departing from the spirit and scope of the claimed invention, the practical embodiments herein illustrated and described merely showing some of the various features entering into the application of the invention.

It is noted that the present pattern control mechanism eliminates entirely the standard types of jacquard controls, since according to the present invention, each thread guiding jack or heddle may be closely associated with the solenoid which, in turn, may be controlled by the reading or indicating mechanism positioned alongside of, or substantially remote from the loom or Nottingham machine. The old type of jacquard control including an elevated structure carrying the pattern cards and having long linen strings extending down to the heddles or jacks may be entirely eliminated.

What is claimed is:

A method of controlling the pattern produced in fabrics by a Nottingham machine or any other loom which comprises providing a stack of separate, non-connected cards, each of which has been punched to control one operating cycle of the machine; feeding said cards one at a time to a reading position; electrically reading the entire card simultaneously at said position to control said operating cycle; displacing said read card into a discard stack; and withdrawing from said stack another card to said reading position.

WILLIAM E. PERRY.